United States Patent
Menkhoff (10) Patent No.: US 7,496,336 B2
(45) Date of Patent: Feb. 24, 2009

(54) WEIGHTING CIRCUIT FOR ADJUSTING A CONTROL LOOP

(75) Inventor: Andreas Menkhoff, Oberhaching (DE)

(73) Assignee: Infineon Technologies AG, Munich (DE)

( * ) Notice: Subject to any disclaimer, the term of this patent is extended or adjusted under 35 U.S.C. 154(b) by 530 days.

(21) Appl. No.: 11/260,675

(22) Filed: Oct. 27, 2005

(65) Prior Publication Data

US 2006/0111069 A1    May 25, 2006

(30) Foreign Application Priority Data

Oct. 28, 2004    (DE) ............ 10 2004 052 418

(51) Int. Cl.
H04B 1/06    (2006.01)

(52) U.S. Cl. .............. 455/230; 455/234.1; 455/24; 700/41; 700/42; 700/43

(58) Field of Classification Search ............ 455/230, 455/424, 425, 456.5, 456.6, 550.1, 575.1, 455/24, 63.1, 69, 126, 173.1, 180.3, 200.1, 455/232.1, 239.1–250.1, 260, 334, 233.1, 455/234.1, 234.2, 334.1; 318/610, 609, 611, 318/628, 619, 616, 615; 375/233, 232; 700/42, 700/43, 45, 41, 37, 53, 54, 28
See application file for complete search history.

(56) References Cited

U.S. PATENT DOCUMENTS

| | | | | |
|---|---|---|---|---|
| 3,810,115 A * | 5/1974 | Stafford | ............ | 708/209 |
| 4,754,391 A * | 6/1988 | Suzuki | ............ | 700/37 |
| 5,229,699 A * | 7/1993 | Chu et al. | ............ | 318/610 |
| 5,331,541 A * | 7/1994 | Ueda et al. | ............ | 700/42 |
| 5,371,670 A * | 12/1994 | Lurie | ............ | 700/40 |
| 5,381,357 A * | 1/1995 | Wedgwood et al. | ............ | 708/319 |
| 5,652,414 A * | 7/1997 | Roberts et al. | ............ | 187/292 |
| 5,677,618 A * | 10/1997 | Fiez et al. | ............ | 323/282 |
| 5,691,896 A * | 11/1997 | Zou et al. | ............ | 700/37 |
| 5,706,217 A * | 1/1998 | Genrich | ............ | 708/200 |
| 5,742,503 A * | 4/1998 | Yu | ............ | 700/42 |
| 5,812,428 A * | 9/1998 | Zou et al. | ............ | 700/34 |
| 5,901,176 A * | 5/1999 | Lewison | ............ | 375/238 |
| 6,343,235 B1 * | 1/2002 | Hausen et al. | ............ | 700/42 |
| 6,435,637 B1 * | 8/2002 | Lyman | ............ | 347/5 |
| 7,024,253 B2 * | 4/2006 | Gaikwad et al. | ............ | 700/37 |
| 7,054,846 B1 * | 5/2006 | Adamy et al. | ............ | 706/1 |
| 7,275,195 B2 * | 9/2007 | Martinez | ............ | 714/733 |
| 2002/0051309 A1 * | 5/2002 | Jibry et al. | ............ | 360/46 |

(Continued)

FOREIGN PATENT DOCUMENTS

JP    01026902 A    1/1989
WO    WO 83/00753 A1    3/1983

*Primary Examiner*—Edward Urban
*Assistant Examiner*—Charles Chow
(74) *Attorney, Agent, or Firm*—Maginot, Moore & Beck (57) ABSTRACT

For a weighting circuit for adjusting a feedback control loop to an input signal of the feedback control loop the feedback control loop comprises a system under control and a device for generating a control difference signal by subtracting a weighted feedback signal from the input signal. The control difference signal is fed to the system under control which generates an output signal. The output signal is multiplied, by means of a weighting circuit by a sequence of multiplication factors for generating the weighted feedback signal. A frequency bandwidth of the feedback control loop is reduced step by step by the sequence of multiplication factors.

21 Claims, 9 Drawing Sheets

U.S. PATENT DOCUMENTS

| | | | |
|---|---|---|---|
| 2002/0080863 A1* | 6/2002 | Nielsen ...................... 375/152 |
| 2003/0188134 A1* | 10/2003 | Sheaffer .................... 712/221 |
| 2004/0039555 A1* | 2/2004 | Ulyanov et al. ................ 703/2 |
| 2004/0065821 A1* | 4/2004 | Warren et al. ............... 250/234 |
| 2004/0123080 A1* | 6/2004 | Bosshart .................... 712/225 |
| 2004/0228397 A1* | 11/2004 | Bach .......................... 375/232 |
| 2004/0252678 A1* | 12/2004 | Rabenko et al. ............. 370/352 |
| 2006/0012344 A1* | 1/2006 | Velhner et al. ................ 322/23 |
| 2006/0217086 A1* | 9/2006 | Mekechuk et al. .......... 455/126 |
| 2008/0107168 A1* | 5/2008 | Xia et al. .................... 375/233 |

* cited by examiner

FIG 1

Prior Art

$$MF = 2^{MSB}\left(1' + \frac{LSB}{2^n}\right) \quad Z = <MSB, LSB> = S + \text{Offset}$$

| MF | Z | Offset | S | MSB | LSB |
|---|---|---|---|---|---|
| 128 | 56 | 24 | 32 | 00111 | 000 |
| 64 | 48 | 24 | 24 | 00110 | 000 |
| 48 | 44 | 24 | 20 | 00101 | 100 |
| 32 | 40 | 24 | 16 | 00101 | 010 |
| 28 | 38 | 24 | 14 | 00100 | 110 |
| 24 | 36 | 24 | 12 | 00100 | 100 |
| 20 | 34 | 24 | 10 | 00100 | 010 |
| 16 | 32 | 24 | 8 | 00100 | 000 |
| 15 | 31 | 24 | 7 | 00011 | 111 |
| 14 | 30 | 24 | 6 | 00011 | 110 |
| 13 | 29 | 24 | 5 | 00011 | 101 |
| 12 | 28 | 24 | 4 | 00011 | 110 |
| 11 | 27 | 24 | 3 | 00011 | 011 |
| 10 | 26 | 24 | 2 | 00011 | 010 |
| 9 | 25 | 24 | 1 | 00011 | 001 |
| 8 | 24 | 24 | 0 | 00011 | 000 |

3rd embodiment

WEIGHTING CIRCUIT FOR ADJUSTING A CONTROL LOOP

BACKGROUND OF THE INVENTION

1. Field of the Invention

The invention relates to a circuit and a method for adjusting a control loop to an input signal, in particular for a signal receiver.

2. Description of the Prior Art

One or a plurality of control loops are provided in many technical apparatuses, in particular in signal receivers.

Figure 1:
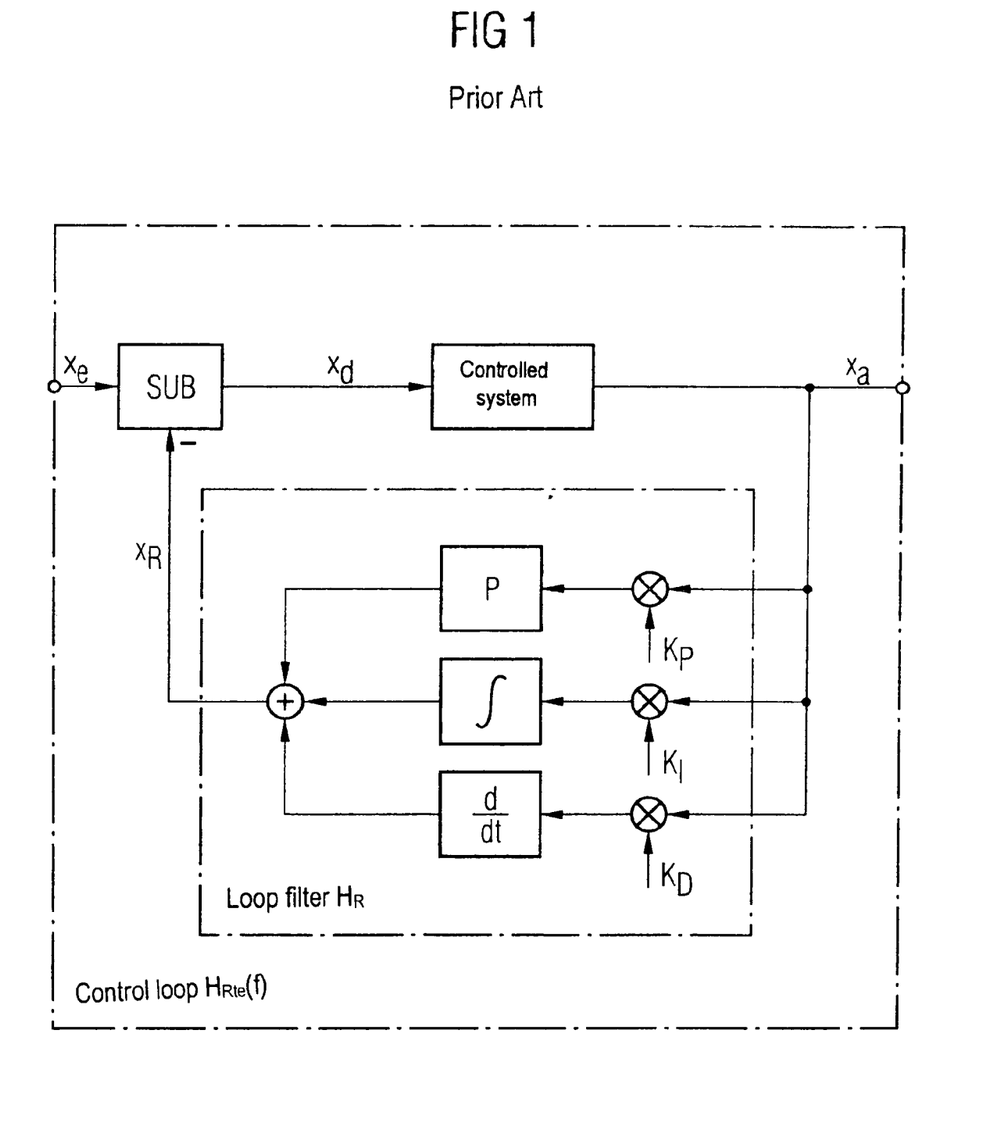
FIG. 1 as discussed above, is a control loop according to the prior art.

FIG. 1 shows a control loop according to the prior art. A subtractor of the control loop subtracts a feedback signal $x_R$, which is output by an internal loop filter, from an input signal $x_e$ present at an input E. The control difference or control deviation $X_d$ generated by the subtractor passes via a controlled system to an output A of the control loop. The output signal $x_a$ of the controlled system, or the controlled variable, is filtered by the loop filter and output as feedback signal $x_R$ to the subtractor. The loop filter or the controller feeds the output signal of the control loop back to the input. The loop filter or the controller is chosen in a manner dependent on the controlled system to be controlled. The control loop according to the prior art as illustrated in FIG. 1 contains a PID controller composed of a proportional (P) controller, an integral (I) controller, and a derivative (D) controller.

The feedback signal output by the PID controller or the loop filter is produced from the output signal as follows:

$$x_R(t) = K_P \cdot x_a(t) + K_I \int x_a(t)\, dt + K_D \frac{dx_a(t)}{dt} \quad (1)$$

where $K_P$, $K_I$, $K_D$ represent the transfer values or control parameters of the controller.

The transfer function of the loop filter reads as follows:

$$H_R(s) = K_P + \frac{K_I}{s} + K_D \cdot s = \frac{K_D \cdot s^2 + K_P S + K_1}{s} \quad (2)$$

FIG. 1 shows a control loop having a PID controller, in which a proportional controller, an integrator controller and a derivative controller are connected in parallel in a loop filter. A loop filter of this type can be extended by connecting in parallel further signal branches in which, by way of example, a plurality of integrators or differentiators are connected in series. The choice of the loop filter or controller depends on the controlled system to be controlled. Controlled systems having a delaying transfer response require an I or PI controller. Although controlled systems having an integration action managed with a P controller, certain additional improvements are possible with a PI controller. In many control tasks, a PID controller is advantageous with regard to realization complexity, handling and achievable effect.

The control loop according to the prior art as illustrated in FIG. 1 may be constructed in digital or analogue form. Control loops are used in particular in the signal receivers. These control loops have to be set differently depending on different requirements. In the case of adjustment to an input signal, the control loop is firstly set, in a so-called acquisition mode, in such a way that it is as fast as possible, that is to say in such a way that it minimizes the control deviation as rapidly as possible. Afterwards, the controller of the control loop is set in a so-called tracking mode in such a way that it is sluggish or slow, in order to effect good suppression of disturbances of the control deviation. The controller or the loop filter is set with the aid of the control parameters $K_P$, $K_I$, $K_D$. The controller has a high frequency bandwidth in the acquisition mode and a small frequency bandwidth in the tracking mode. The control loop is fast in the acquisition mode, and the control loop suppresses noise disturbances well in the tracking mode.

In many applications, an integrated circuit contains a multiplicity of control loops. By way of example, it is customary to provide, on a digital receiver, a control loop for analogue gain setting, a further control loop for digital gain setting, a control loop for carrier frequency setting, a control loop for carrier phase setting and, finally, a further control loop for clock phase setting. Moreover, further control loops are provided for channel estimation within a receiver. The setting of the respective control parameters brings about a change in the limiting frequency fg of the respective control loop.

Figure 9A:
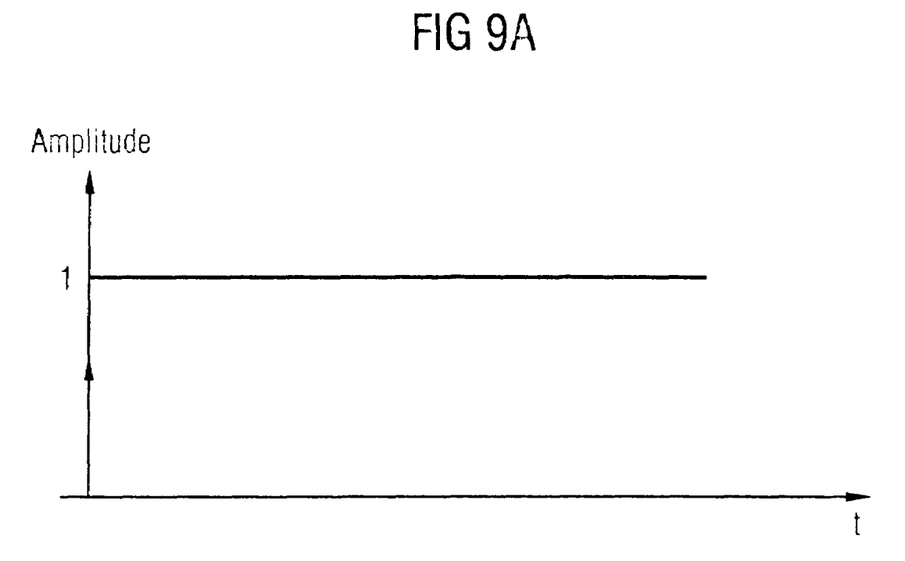
FIGS. 9a, 9b are signal diagrams for elucidating the behaviour of a conventional control loop in comparison with a control loop comprising an inventive weighting circuit.
Figure 9B:
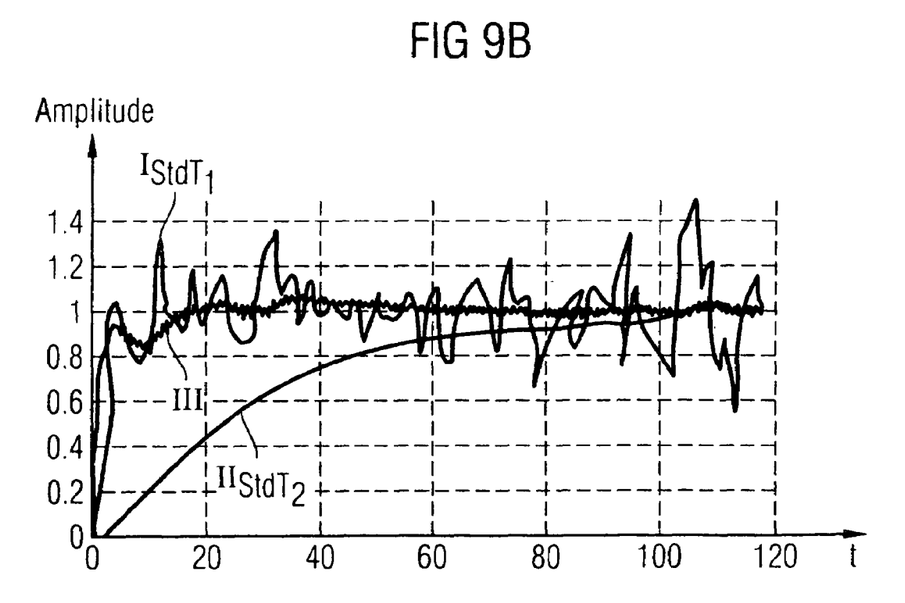

FIG. 9 shows the step response of a control loop according to the prior art. If the step signal illustrated in FIG. 9a is applied to a control loop according to the prior art, the signal profiles illustrated in FIG. 9 are produced. The curve I shows the step response of a conventional control loop operating in the acquisition mode, while the curve II illustrates the step response of a conventional control loop in the tracking mode. FIG. 9b shows the step response at the output of the loop filter. If the control loop in the tracking mode slowly approaches the desired value of 1, in the acquisition mode the signal fluctuates greatly around the desired value of 1. In conventional control loops, the control loop is firstly in the acquisition mode and is then changed over to the tracking mode. This is done by changing over between two sets of control parameters $k_p$, $k_i$, $k_d$ for setting the loop filter. The hard changeover between two sets of control parameters results in no minimization of the control deviation integrated in the time profile, that is to say of the energy of the control error or of the control difference signal $x_d$.

SUMMARY OF THE INVENTION

It is an object of the present invention to provide a weighting circuit for adjusting a control loop to an input signal by means of which the control deviation is minimized.

The object is achieved in accordance with the invention by means of a weighting circuit for adjusting a control loop to an input signal $x_e$, the control loop having a device which subtracts from the input signal $x_e$ a weighted feedback signal $x_R$ for the generation of a control difference signal $x_d$, which is output to a controlled system of the control loop, an output signal $X_a$ of the controlled system being multiplied, by means of the weighting circuit by a sequence of multiplication factors MF for the generation of the weighted feedback signal $x_R$, a frequency bandwidth $f_g$ of the control loop being reduced step by step by the sequence of multiplication factors MF.

In a preferred embodiment of the inventive weighting circuit the frequency bandwidth $f_g$ of the control loop may be halved step by step by the sequence of multiplication factors MF.

In a restricted version of the inventive circuit each multiplication factor for the weighting of the output signal of the controlled system is multiplied by said output signal for a specific time duration.

In a further restricted version of the inventive weighting circuit the sequence of multiplication factors is such that a time duration/bandwidth product of the time duration for halving the frequency bandwidth and the frequency bandwidth of the control loop that is currently set during the adjustment operation is constant during the adjustment operation.

The controlled system may be formed by a signal delay circuit.

The weighting circuit may be of digital construction.

In a restricted version of the inventive weighting circuit the weighting circuit has a signal input for application of an output signal value of the controlled system, said signal input being connected to a controllable first shift register, the controllable first shift register shifting the applied output signal value towards the left in a manner dependent on m more significant bits of a control data word.

In a further restricted version of the inventive weighting circuit according to the invention, the weighting circuit has a multiplier, which multiplies the signal value that has been shifted towards the left by the controllable first shift register by n less significant bits of the control data word.

The weighting circuit may have a second shift register, which shifts the product value generated by the multiplier towards the right in accordance with the number n of less significant bits of the control data word.

In another restricted version of the inventive weighting circuit it has a first adder, which adds the signal value that has been shifted towards the left by the first shift register to the product value that has been shifted towards the right by the second shift register and outputs the sum to a signal output of the weighting circuit.

The control data word may comprise a first number n of more significant bits and a second number n of less significant bits.

In this case, the control data word is preferably buffer-stored in a register.

The weighting circuit may have a second adder, which adds an offset value to a signal value, the signal value being generated by a signal sequence generator.

In this case, the signal sequence generator is preferably programmable.

The inventive weighting circuit may have a memory for buffer-storing the offset value.

The inventive weighting circuit may be provided in a loop filter of the control loop.

A proportional element may preferably be connected downstream of the inventive weighting circuit.

As an alternative, an integrator may be connected downstream of the inventive weighting circuit.

As an alternative, a differentiator may be connected downstream of the inventive weighting.

In one alternative embodiment, the inventive weighting circuit may be of analogue construction.

The object is also achieved in accordance with the invention by means of a method for adjusting a control loop to an input signal, having the following steps, namely subtraction from the input signal $x_e$ of a weighted feedback signal $x_R$ for the generation of a control difference signal $x_d$, which is output to a controlled system; multiplication of an output signal of the controlled system by a sequence of multiplication factors MF for the generation of the weighted feedback signal $x_R$, a frequency bandwidth $f_g$ of the control loop being reduced step by step by the sequence of multiplication factors MF.

Preferred embodiments of the weighting circuit of the invention and of the method according to the invention are furthermore described with reference to the accompanying figures for elucidating features essential to the invention.

DESCRIPTION OF THE PREFERRED EMBODIMENTS

Figure 2:
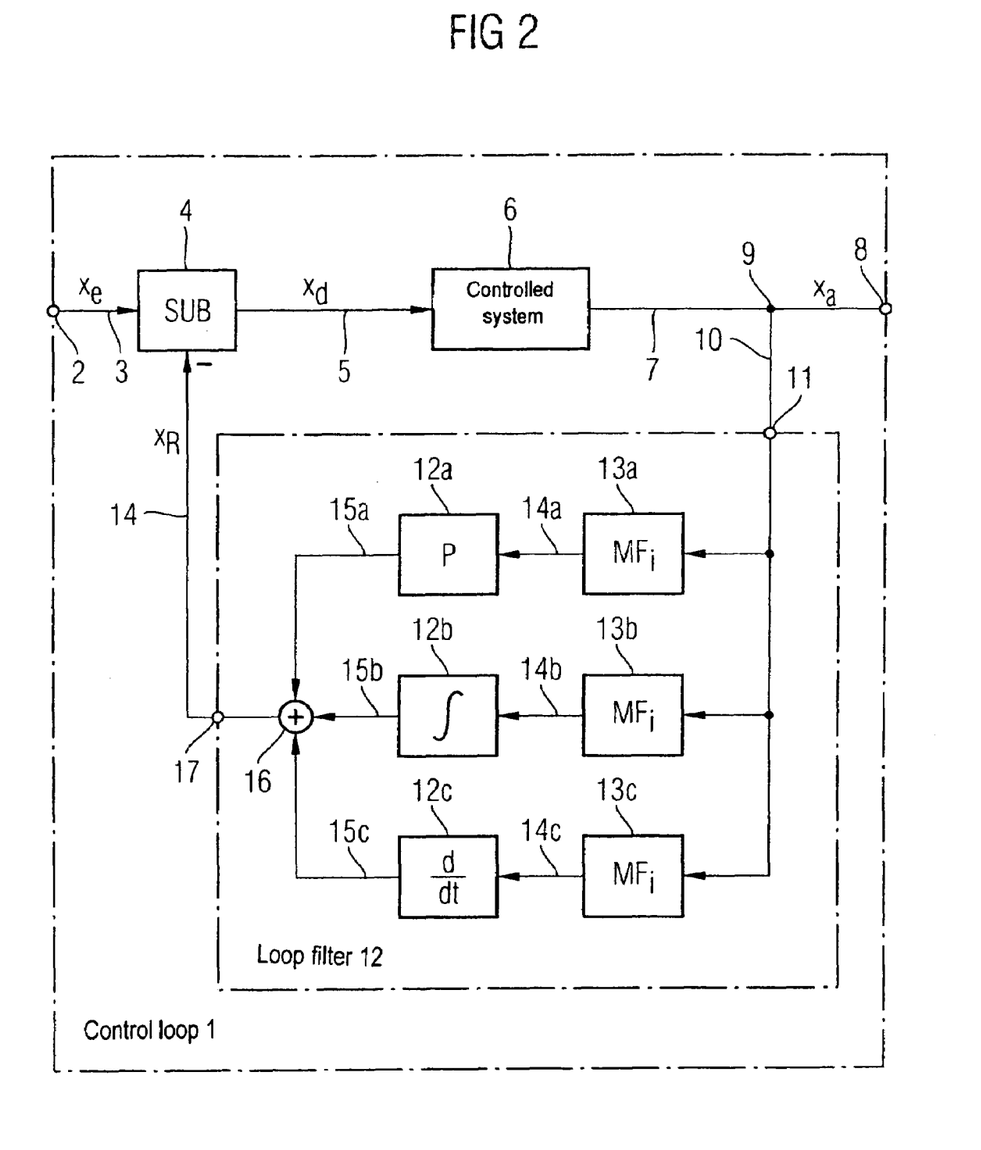
FIG. 2 is a control loop comprising weighting circuits according to the invention.

As can be discerned from FIG. 2, a control loop 1 has a signal input 2 for application of an input signal $x_e$. The input signal $x_e$ may be complex-valued. The signal input 2 is connected via an internal line 3 of the control loop 1 to a device 4 which subtracts from the input signal $x_e$, a weighted feedback signal $x_R$ for the generation of a control difference signal $x_d$. The control difference signal $x_d$ output by the device 4 is output via an internal line to a controlled system 6 of the control loop 1. The device 4 is preferably a subtractor. In an alternative embodiment, the device 4 is formed by a mixer, in this embodiment a carrier phase detector additionally being provided in the feedback path upstream of the loop filter 12. As an alternative, the device 4 is formed by a resampling filter or by a Cordic circuit. The controlled system 6 may be any arbitrary controlled system. In one embodiment the controlled system 6 is formed by a signal delay circuit, for example a simple signal line. The output signal of the controlled system 6 is output via an internal line 7 to a signal output 8 of the control loop 1. At a branching node 9, the output signal of the controlled system 6 is tapped off and applied via an internal line 10 to a signal input 11 of a loop filter of controller 12. The loop filter 12 has a signal output 13, which applies a weighted feedback signal $X_R$ to the device 4 via an internal line 14.

In the case of the embodiment illustrated in FIG. 2, the controller or the loop filter 12 comprises a so-called PID controller, in which a proportional element 12a, an integrator 12b and a differentiator 12c are connected in parallel. The proportional element 12a, the integrator 12b and the differentiator 12c are respectively connected downstream of a weighting circuit 13a, 13b, 13c according to the invention. The weighting circuits 13a, 13b, 13c provided in the loop filter 12 are constructed identically in terms of circuitry. The weighting circuits 13a, 13b, 13c acquire the output signal of the controlled system 6 that is applied to the signal input 11 of the loop filter 12 and weight this signal with a sequence of multiplication factors. The weighted output signal of the controlled system 6 that is output by the weighting circuits 13a, 13b, 13c is output via lines 14a, 14b, 14c to the proportional element 12a connected downstream, the integrator 12b connected downstream, and to the differentiator 12c connected downstream. The proportional element 12a, the integrator 12b and the differentiator 12c are respectively connected via output lines 15a, 15b, 15c to an adder 16 within the loop filter 12, which adder adds the signals to form the feedback signal $x_R$.

In the case of the control loop 1 as illustrated in FIG. 2, this control loop has three weighting circuits 13a, 13b, 13c according to the invention within a loop filter 12. The weighting circuits multiply the output signal of the controlled system 6 by a sequence of multiplication factors $MF_1$. In this case, the frequency bandwidth $f_g$ of the control loop 1 is reduced step by step by the sequence of multiplication factors $MF_1$. In one preferred embodiment of the weighting circuit 13 according to the invention, the frequency bandwidth $f_g$ of the control loop 1 is in this case halved step by step by the sequence of multiplication factors. Each multiplication factor $MF_1$ of the sequence of multiplication factors for the weighting of the output signal of the controlled system 6, is multiplied by the output signal $x_a$ for a specific time duration. In this case, the time duration/bandwidth product of the time duration for halving the frequency bandwidth $f_g$ and the frequency bandwidth of the control loop 1 that is currently set during the adjustment operation is constant during the adjustment operation.

Figure 3:
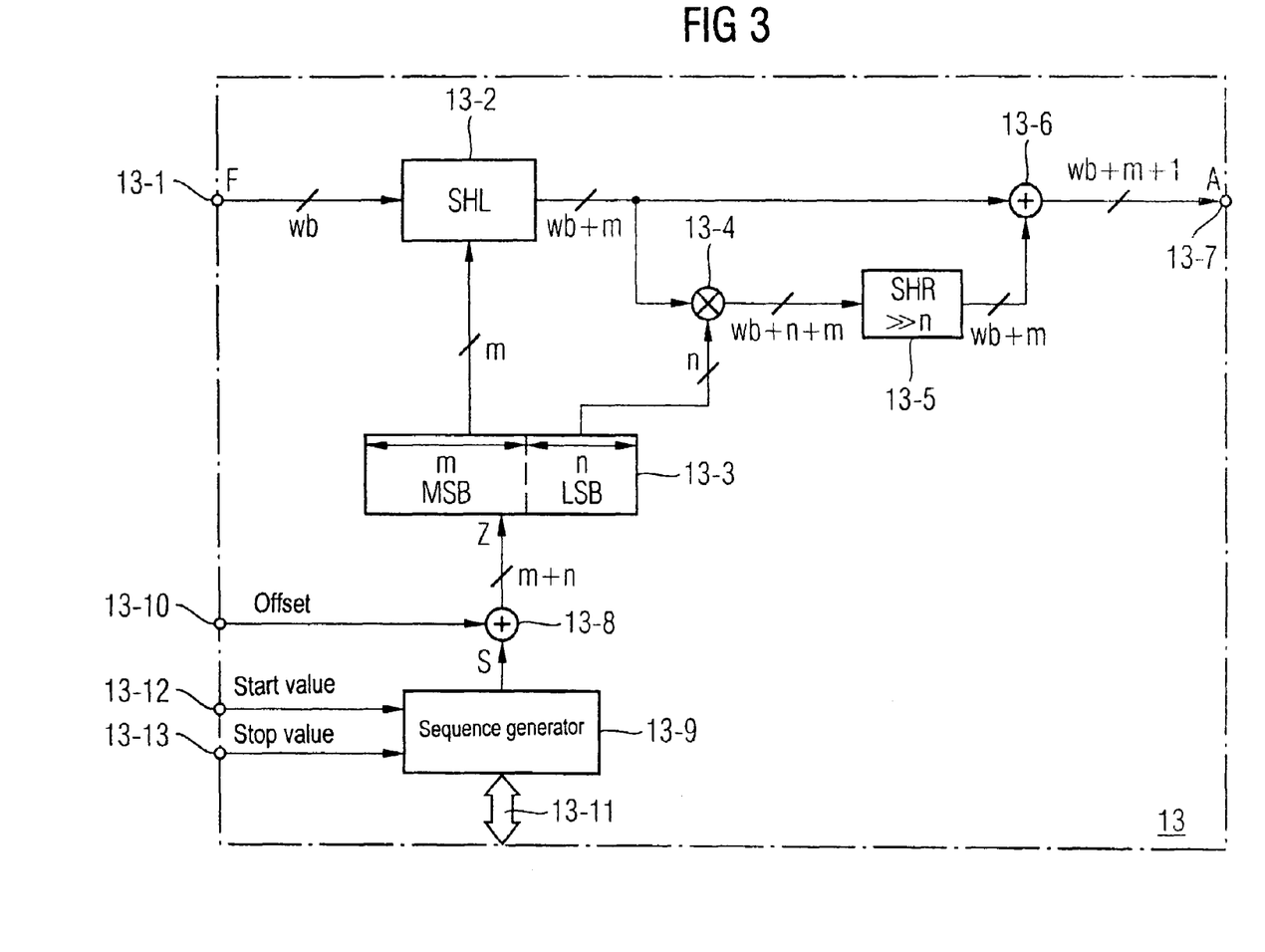
FIG. 3 is the circuitry construction of a preferred embodiment of the inventive weighting circuit.

FIG. 3 shows a preferred embodiment of the weighting circuits 13 illustrated in FIG. 2. Each weighting circuit 13 has a signal input 13-1 for application of the signal to be weighted. The signal input 13-1 of the weighting circuit 13 is connected to a first shift register 13-2. The first shift register 13-2 is a controllable shift register which shifts the applied signal value towards the left in a manner dependent on m more significant bits (MSB) of a control data word Z. In the case of the embodiment illustrated in FIG. 3, the weighting circuit 13 has a register 13-3 for buffer-storing the control data word Z. The control data word Z comprises m more significant bits (MSB) and n less significant bits (LSB). The control data word Z comprises m=5 more significant bits and n=3 less significant bits, by way of example, in one preferred embodiment. Accordingly, the control data word Z comprises a total of 8 bits in this embodiment. The more significant control bits MSB buffer-stored in the register 13-3 drive the first shift register 13-2 via m control lines. The shift register 13-2 shifts the applied signal value, which has the word width $w_b$, towards the left in a manner dependent on the m more significant bits.

The weighting circuit 18 according to the invention furthermore has a multiplier 13-4 which multiplies the signal value that has been shifted towards the left by the controllable first shift register 13-2 by the n less significant bits (LSB) of the control data word Z.

The weighting circuit 13 according to the invention furthermore has a second shift register 13-5, which shifts the product value generated by the multiplier 13-4 towards the right in accordance with the number n of less significant bits (LSB) of the control data word Z. On the output side, the second shift register 13-5 is connected to a first adder 13-6 of the weighting circuit 13 according to the invention. The first adder 13-6 adds the signal value that has been shifted towards the left by the first shift register 13-2 to the product value that has been shifted towards the right by the second shift register 13-5, and outputs the summation value to a signal output 13-7 of the weighting circuit 13.

In one embodiment, the weighting circuit 13 furthermore contains a second adder 13-8, which adds an offset value to a signal value S for the generation of the control data word Z. In this case, the signal value S is preferably generated by a signal sequence generator 13-9. In one embodiment, the offset value is applied to a signal input 13-10 of the weighting circuit 13. In an alternative embodiment, the offset value is buffer-stored in a further buffer memory. The signal sequence generator 13-9 is preferably programmable via an interface 13-11. Moreover, in one preferred embodiment, the signal sequence generator 13-a acquires a start value via a first control input 13-12 and a stop value via a further control input 13-13.

As can be gathered from FIG. 2, either a proportional element 12a, an integrator 12b or a differentiator 12c is connected downstream of the weighting circuit 13 according to the invention.

The weighting circuit 13 illustrated in FIG. 3 is of digital construction. In an alternative embodiment, the weighting circuit 13 may also be of analogue construction.

The functioning of the weighting circuit 13 according to the invention is described below.

The output signal value at the output 13-7 of the weighting circuit 13 results from the product of the input signal applied to the signal input 13-1 with a multiplication factor MF:

$$\text{Output signal} = MF \cdot \text{input signal} \quad (1)$$

In this case, the multiplication factor MF depends as follows on the more significant bits (MSB) and the less significant bits (LSB) of the control data word Z which is buffer-stored in the register 13-3:

$$MF = 2^{MSB}\left(1 + \frac{LSB}{2^n}\right) \quad (2)$$

where $$0 \leq MSB \leq 2^m - 1 \quad (3)$$

$$0 \leq LSB \leq 2^n - 1 \quad (4)$$

In the case of the weighting circuit 13 according to the invention, the value range of the multiplication factor MF results as follows:

$$1 \leq MF \leq MF_{max} \quad (5)$$

the minimum multiplication factor $MF_{min}$ being one:

$$MF_{\min} = 2^0\left(1 + \frac{0}{2^n}\right) = 1 \quad (6)$$

The maximum multiplication factor $M_{max}$ results as $$MF_{\max} = 2^{(2^m - 1)}\left[1 + \frac{2^n - 1}{2^n}\right] \quad (7)$$

In one preferred embodiment, the number of more significant bits (MSB) is m=5 and the number of less significant bits (LSB) is n=3.

Consequently, in the case of this preferred embodiment, the value range of the multiplication factors MF that can be set results as follows:

$$0 \leq MSB \leq 2^5-1=31 \quad (8)$$

$$0 \leq LSB \leq 2^3-1=7 \quad (9)$$

$$MF_{min} = 2^0\left(1 + \frac{0}{2^3}\right) = 1 \quad (10)$$

$$MF_{max} = 2^{31}\left(1 + \frac{7}{2^3}\right) = 2^{31}\left(1 + \frac{7}{8}\right) \quad (11)$$

The multiplication factor MF defined by equation (2) can be represented with:

$$MSB = n+k \quad (12)$$

as follows:

$$MF = 2^{n+k}\left(1 + \frac{LSB}{2^n}\right) \quad (13)$$

where $2^k$ represents the absolute step size ASW of the weighting circuit 13 according to the invention. If n=3 less significant bits LSB are provided in the case of the weighting circuit 13, the multiplication factors $MF_i$ of the weighting circuit 13 according to the invention result as follows:

$\boxed{K=0}$
Step size 1

$2^3(1+0/8) = 8$ $2^3(1+1/8) = 9$ $2^3(1+2/8) = 10$ $2^3(1+3/8) = 11$ $\vdots$ $2^3(1+7/8) = 15$ $\boxed{K=1}$
Step size 2

$2^4(1+0/8) = 16$ $2^4(1+1/8) = 18$ $2^4(1+2/8) = 20$ $2^4(1+7/8) = 30$ $\boxed{K=2}$
Step size 4

$2^5(1+0/8) = 32$ $2^5(1+1/8) = 36$ $\vdots$ $2^5(1+7/8) = 60$

-continued $\boxed{K=3}$
Step size 8

$2^6(1+0/8) = 64$ $2^6(1+6/8) = 112$ $2^6(1+7/8) = 120$ $\boxed{K=28}$
Step size $2^{28}$ $2^{31}(1+0/8) = 2^{31}$ $\vdots$ $2^{31}(1+7/8) = 2^{31} + 7 \cdot 2^{28}$ The absolute step size ASW of the weighting circuit 13 according to the invention results as:

$$ASW = 2^K \quad (15)$$

The relative step size RSW of the weight circuit 13 according to the invention thus results as:

$$RSW = \frac{MF_{LSB+1}}{MF_{LSB}} = \frac{2^{n+k}\left(1 + \frac{LSB+1}{2^n}\right)}{2^{n+k}\left(1 + \frac{LSB}{2^n}\right)} = \frac{2^n + 1 + LSB}{2^n + LSB} \quad (16)$$

For the preferred embodiment in which the number of less significant bits (LSB) n=3, the relative step size RSW of the weighting circuit 13 according to the invention thus results as:

$$RSW = \frac{9 + LSB}{8 + LSB} \quad (17)$$

where $$0 \leq LSB \leq 2^n - 1 = 7 \quad (18)$$

The relative step size RSW of the weighting circuit 13 according to the invention thus results, in a manner dependent on the less significant bits LSB for n=3, as:

$RSW(LSB=0)=9/8$ $RSW(LSB=1)=10/9$ $RSW(LSB=2)=11/10$ $RSW(LSB=3)=12/11$ $RSW(LSB=4)=13/12$ $RSW(LSB=5)=14/13$ $RSW(LSB=6)=15/14$ $RSW(LSB=7)=16/15 \quad (19)$ The relative step size RSW for different absolute step sizes K of the weighting circuit 13 according to the invention is constant. The following thus holds true:

$9/8(K=0)=18/16(K=1)=36/32(K=2)=72/64(K=3) \quad (20)$

One advantage of the weighting circuit 13 according to the invention such as is used at the loop filter 12 of the control loop 1, compared with conventional multipliers such as are used in the loop filter of the conventional control loop illustrated in FIG. 1, is that, unlike in conventional multipliers, the quantization of the weighting circuit according to the invention 13 is not linear. Conventional multipliers inherently have a linear quantization. This means that the change of a less significant bit (LSB) may have very different effects, as seen in relative terms. By way of example, in the case of a 7-bit multiplier, in the case of a transition of the less significant bit LSB from one to two, a multiplication factor of 1/128 is changed to 2/128, that is to say that the multiplication factor MF changes by 100%. In the case of a change in a more significant bit, for example from 100/128 to 101/128, the multiplication factor MF changes merely by 1% by contrast. For a user, therefore, conventional weighting circuits with multipliers can be intuitively set only very poorly, since, in the case of small values, the multiplication factor MF is changed greatly as a result of a change in a less significant bit LSB, and, in the case of large values, almost no change takes place in the multiplication factor in the event of a change in a less significant bit LSB. The weighting circuit 13 according to the invention thus has the advantage that it can be set significantly more easily in comparison with conventional weighting circuits.

A further disadvantage of a weighting circuit that uses multipliers is that for the fine quantization even of small values, the multipliers have to be of large design, that is to say that they have to have a high bit width. This increases the outlay on circuitry. In the case of a multiplier having a predetermined bit width, it is therefore generally the case that, for small signal values, the quantization afforded by the multiplier is too coarse and, for large signal values, the quantization afforded by the multiplier is too fine. Therefore, a fine uniform changing of the control parameters is not possible with conventional weighting circuits that use multipliers, since the linear quantization steps are either too coarse or too small.

Figure 4:
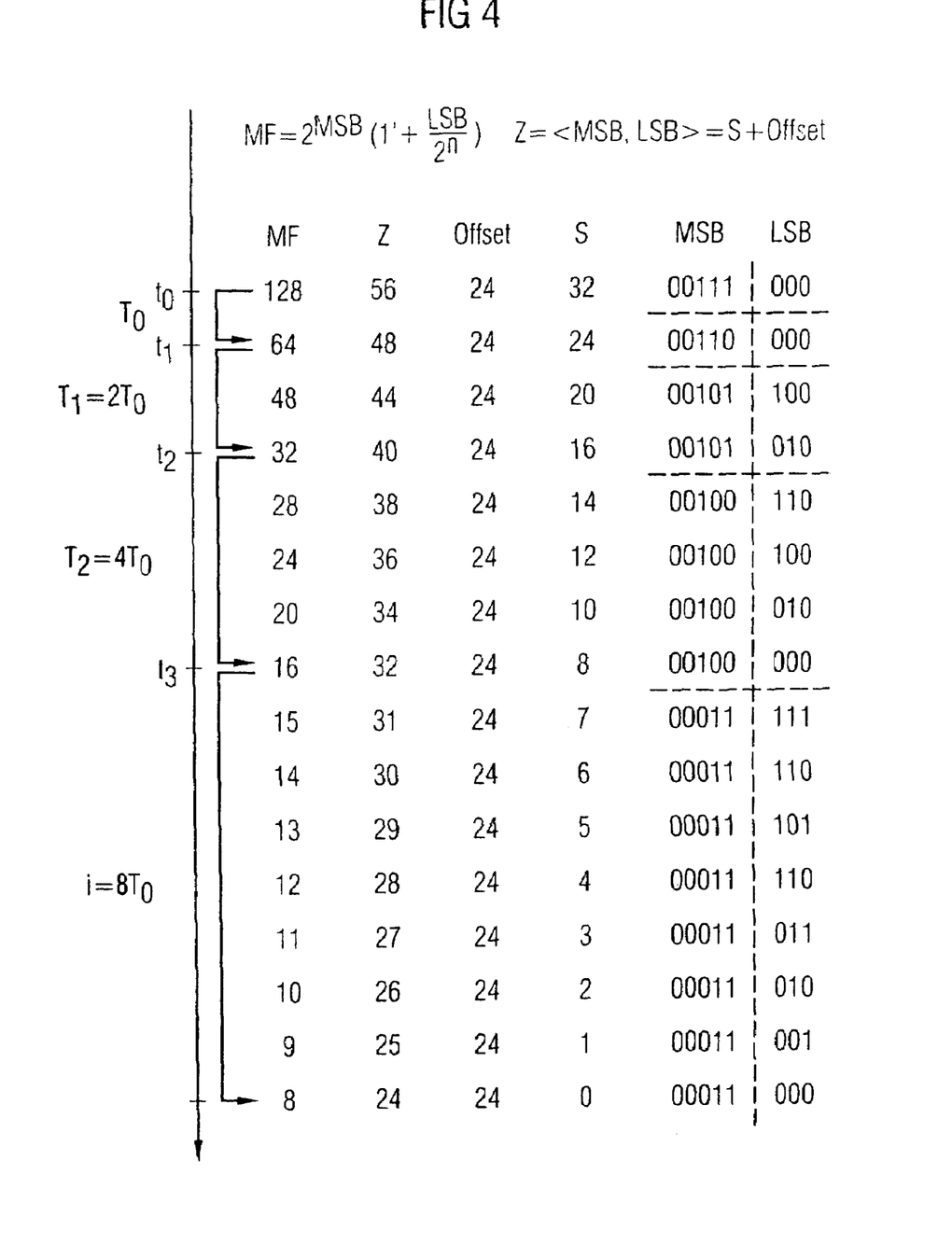
FIG. 4 is a table for elucidating the functioning of the weighting circuit as illustrated in FIG. 3.

The table illustrated in FIG. 4 represents the functioning of the weighting circuit 13 according to the invention as shown in FIG. 3 in a preferred embodiment. In the example illustrated in FIG. 4, the weighting circuit 13 according to the invention is used to reduce the multiplication factor MF for the weighting of the output signal of the controlled system 6 bit by bit from an initial value 128 to an end value 8.

The table shown in FIG. 4 shows the bit sequence bufferstored in the register 13-3, the more significant bits MSB driving the shift register 13-2 and the less significant bits LSB being applied to the multiplier 13-4.

At the instant $t_0$ the output signal of the controlled system that is to be weighted is weighted with a multiplication factor 128. For this purpose, the shift register 13-2 shifts the applied signal value by seven places towards the left, which corresponds to a multiplication by a factor $2^7=128$. Accordingly, the more significant bits MSB have a corresponding value in digital form (7=00111). The less significant bits LSB bufferstored in the register 13-3 are all zero at the instant $t_0$. The bit sequence stored in the register 13-3 corresponds to a controlled data word Z=56. In the case of the embodiment illustrated in FIG. 13, said control data word Z is formed by the sum of a constant offset value Offset=24 and a signal value S=32.

At the instant $t_1$, the multiplication factor MF is halved to MF=64. For this purpose, the control data word Z is set to 48 by adding the constant offset value 24 to a lower signal value S=24. In this way, the multiplication factor MF is reduced sequentially or step by step to an end value 8. FIG. 4 shows the corresponding control data word Z and also the corresponding signal values S generated by the sequence generator 13-9.

Figure 5:
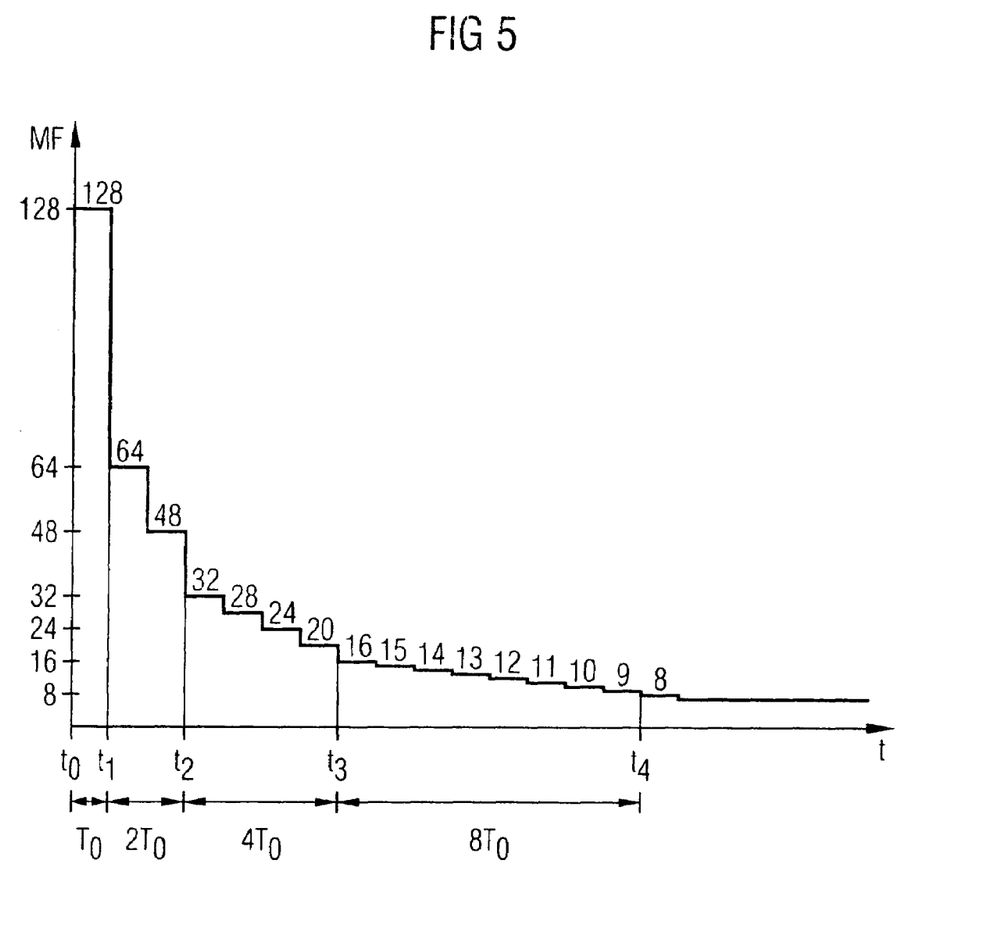
FIG. 5 is a diagram for elucidating the functioning of the preferred embodiment of the weighting circuit as illustrated in FIG. 3.

FIG. 5 shows the change in the multiplication factor MF in the time profile as a result of the example illustrated in FIG. 4.

As can be discerned from FIG. 5, the multiplication factor MF is reduced in time-discrete fashion.

As can be discerned from the table in FIG. 4, the multiplication factor sequence, that is to say the sequence of multiplication factors $MF_i$, is such that the time duration/bandwidth product is constant.

The time duration/bandwidth product results from the time duration for halving the frequency bandwidth $f_g$ of the control loop 1 and the frequency bandwidth $f_{gi}$ of the control loop 1 that is currently set during the adjustment operation.

$$\Delta T_0 = t_1 - t_0 \qquad f_{g0} = f_g/t = t_0 \qquad (21)$$

$$\Delta T_1 = t_2 - t_1 = 2 \cdot \Delta T_0 \qquad f_{g1} = f_g/t = t_1 = \frac{f_{g0}}{2}$$

$$\Delta T_2 = t_3 - t_2 = 2 \cdot \Delta T_1 \qquad f_{g2} = f_g/t = t_2 = \frac{f_{g1}}{2}$$

$$\Delta T_3 = t_4 - t_3 = 2 \cdot \Delta T_2 \qquad f_{g3} = f_g/t = t_3 = \frac{f_{g2}}{2}$$

$$\Delta T_i = t_{i+1} - t_i = 2 \cdot \Delta T_{i-1} \qquad f_{gi} = f_g/t = t_i = \frac{f_{gi-1}}{2}$$

Consequently, the following relationship results for the time duration/bandwidth product (ZBP):

$$ZBP = \Delta T_i \cdot f_{gi} = 2\Delta T_{i-1} \cdot f_{gi-1} = \text{constant} \qquad (22)$$

The frequency bandwidth fg of the control loop 1 is halved step by step by the sequence of multiplication factors $MF_i$. The change in the multiplication factors $MF_i$ becomes smaller and smaller as the frequency bandwidth $f_{gi}$ of the control loop decreases.

Figure 6:
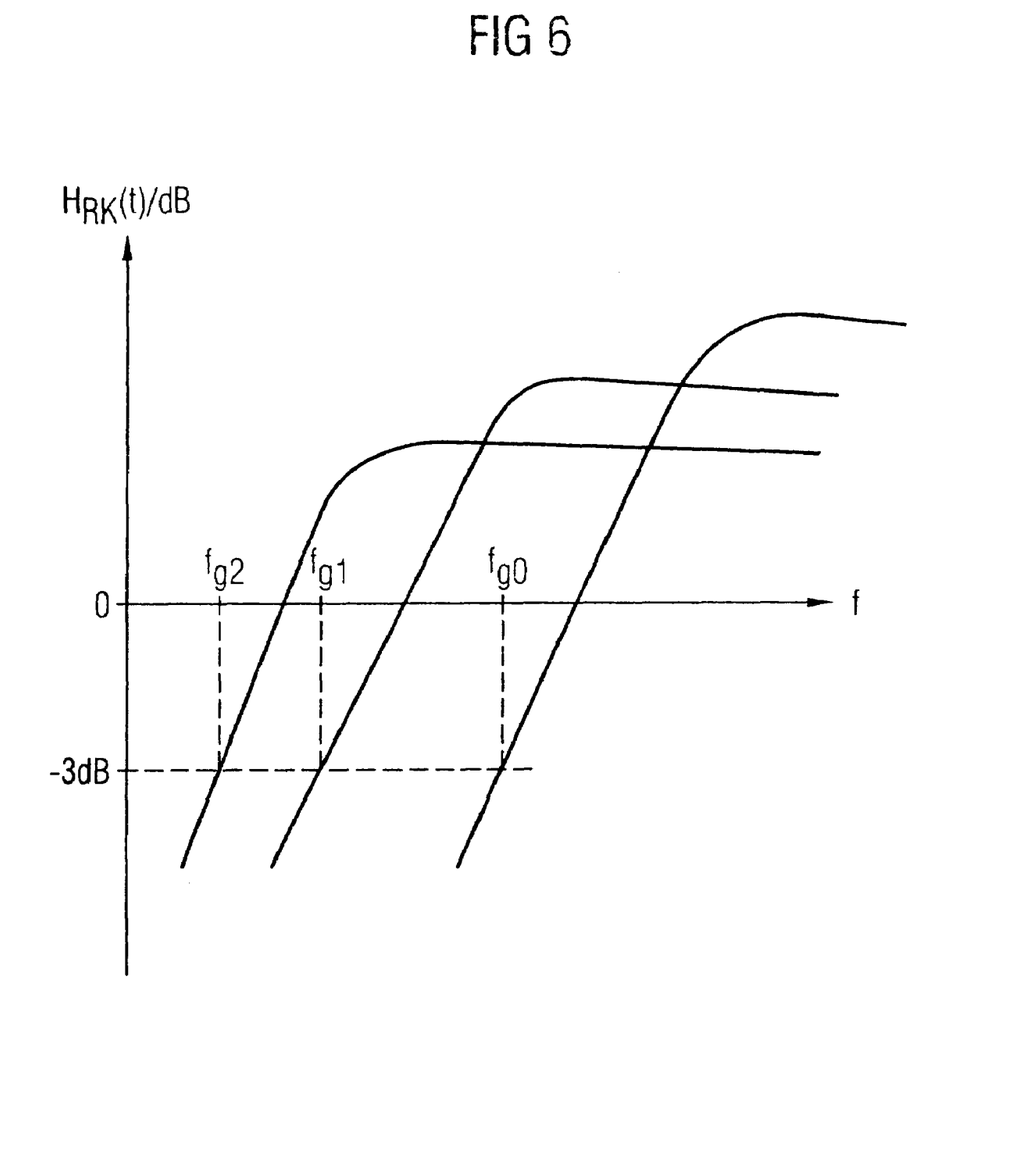
FIG. 6 is the transfer function of an inventive weighting circuit.

FIG. 6 shows the transfer characteristic of the control loop 1 containing the weighting circuit 13 according to the invention, as a function of the frequency f. The frequency bandwidth $f_g$ of the control loop leads to an amplitude attenuation of −3 dB. The control loop 1 has a high-pass filter behaviour with a specific frequency bandwidth $f_g$, that is to say that the frequency range is between 0 Hz and the limiting frequency $f_g$. By halving the multiplication factor MF, the frequency bandwidth $f_{g1}$ is halved at the instant $t_1$. By further reducing the multiplication factor to the multiplication value MF=32, the limiting frequency $f_{g2}$ of the control loop 1 is once again halved at the instant $t_2$. As can be discerned from FIGS. 4, 5, 6 the bandwidth product is constant during the adjustment operation.

In the case of the preferred embodiment of the weighting circuit 13 according to the invention as illustrated in FIG. 3, the signal value S, which is added to the offset value to form the control data word Z, is generated by the signal sequence generator 13-9.

The signal sequence S illustrated in FIG. 4 can preferably be generated by the signal sequence generator 13-9 in accordance with the following program:

Ref=$2^n$ (23)

$S_{Start}:=32$ $S_{Stop}:=\emptyset$

DELTA=REF $S:=S_{Start}$

While $S \geq S_{Stop}$

Output S $S:=S-$DELTA $$\text{IF } Modulo[S/REF] = \emptyset \text{ THEN DELTA} := \frac{\text{DELTA}}{2}$$

In this case a start value $S_{Start}=32$ is transferred to the signal sequence generator via a control input 13-12 and a stop value $S_{Stop}=0$ is applied via a further control input 13-13.

A reference viable REF depends on the number n of less significant bits LSB. In one preferred embodiment, n=3.

As long as the signal value S is greater than the stop value, the signal value S is reduced by a $\Delta$ value Delta. Firstly, the $\Delta$ value is equal to the reference variable. The A value is halved if modulo (S/REF)=0.

In a first embodiment, the signal sequence generator 13-9 is a programmable microprocessor. In an alternative embodiment, the program specified above is hardwired.

In the case of the embodiment illustrated in FIG. 3, the control data word Z is generated with the aid of an offset value and the signal sequence generator 13-9. In an alternative embodiment, the control data word Z is written externally to the register 13-3. In this embodiment, the weighting circuit 13 consequently does not contain an adder 13-8 and a signal sequence generator 13-9.

With the weighting circuit 13 according to the invention as illustrated in FIG. 3, the frequency bandwidth $f_g$ of the control loop 1 is halved step by step by the sequence of multiplication factors $MF_i$, the time duration-bandwidth product remains constant. The control loop 1 is thus transferred step by step or continuously from an acquisition operating mode, in which the control loop has a high bandwidth, to a tracking mode, in which the control loop has a low bandwidth. The curve II in FIG. 9b shows the corresponding step response of the control loop 1 containing the weighting circuit 13 according to the invention.

In this case, the control deviation or the energy of the control difference signal $x_d$ over time is minimized by means of the weighting circuit 13 according to the invention.

$$\text{Control deviation} = \int_0^\infty x_d^2 \, dt \to \min \quad (24)$$

The weighting circuit 13 according to the invention reduces the multiplication factor MF in time-discrete steps, the time duration/bandwidth product being constant. As the frequency bandwidth $f_g$ decreases, the change in the multiplication factor for the weighting value is smaller and smaller.

Figure 7:
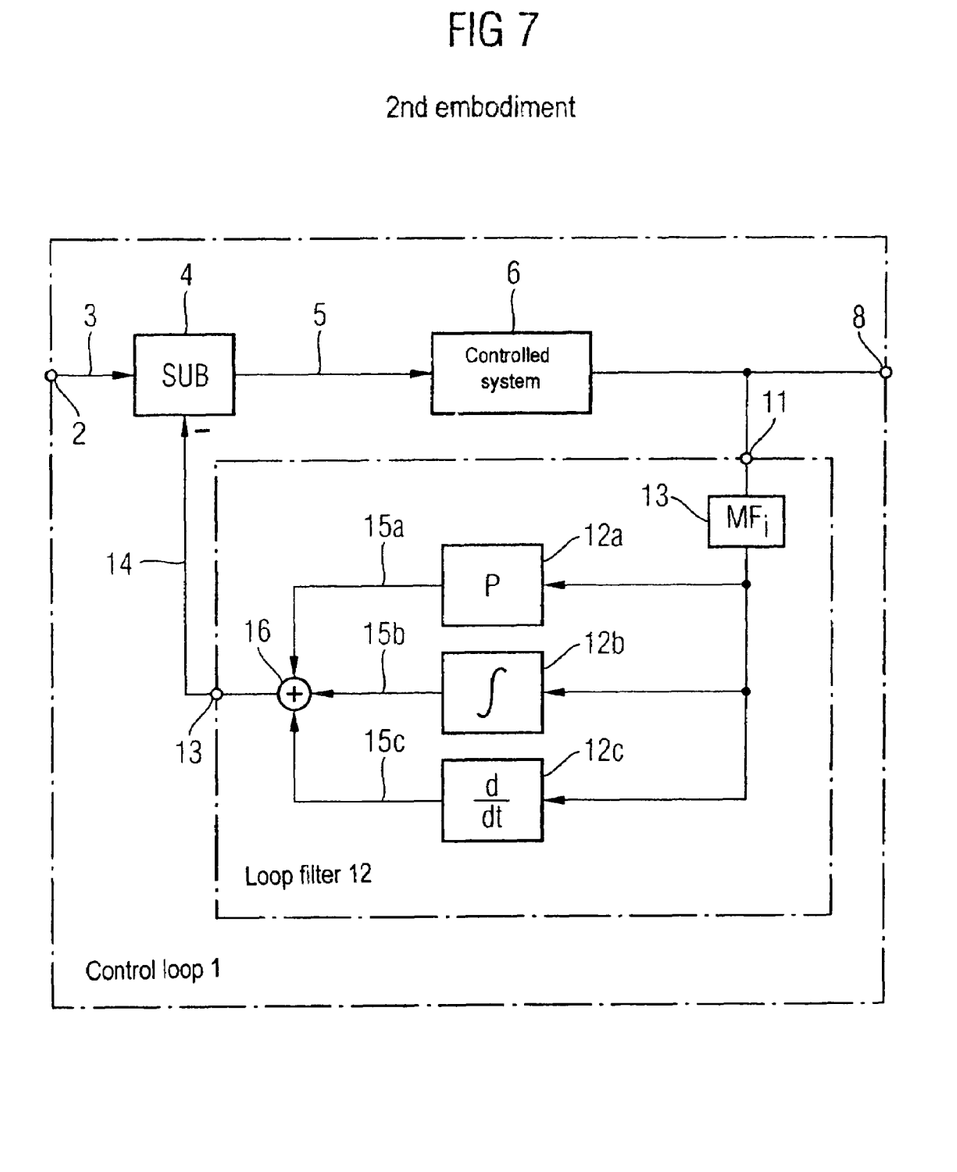
FIG. 7 is a further exemplary embodiment of a control loop comprising an inventive weighting circuit.

FIG. 7 shows a further embodiment of the control loop 1. In this embodiment, a weighting circuit 13 provides the multiplication of the output signal of the controlled system 6 by a sequence of multiplication factors. On the output side, a proportional element 12a, an integrator 12b and a differentiator 12c are connected to the weighting circuit 13.

Figure 8:
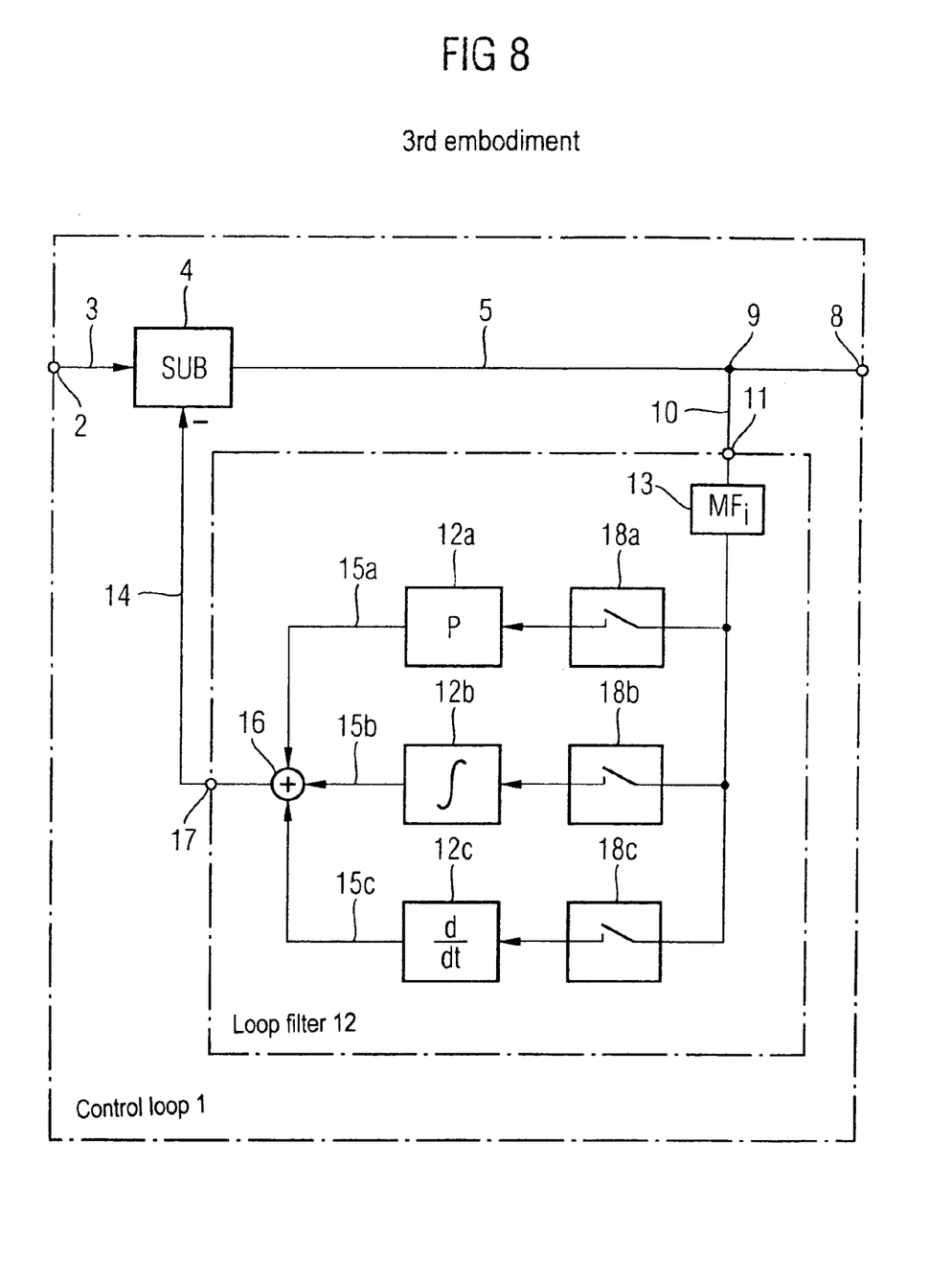
FIG. 8 is a further exemplary embodiment of a control loop comprising an inventive weighting circuit according to the invention.

FIG. 8 shows a further embodiment of the control loop 1, in which likewise only one weighting circuit 13 is provided, which is connected via controllable switching devices to the proportional element 12a, the integrator 12b and the differentiator 12c.

Although modifications and changes may be suggested by those skilled in the art, it is the intention of the inventor to embody within the patent warranted heron all changes and modifications as reasonably and properly come within the scope of his contribution to the art.

I claim as my invention:

1. A weighting circuit for adjusting a feedback control loop to an input signal of said feedback control loop;

said feedback control loop comprising a system under control and a device for generating a control difference signal by subtracting a weighted feedback signal from said input signal; said control difference signal being fed to said system under control;

said system under control generating an output signal in response to said control difference signal and said output signal of said system under control being multiplied, by means of a weighting circuit by a sequence of multiplication factors for generating said weighted feedback signal; and a frequency bandwidth of said feedback control loop being reduced step by step by said sequence of multiplication factors;

wherein each of said multiplication factors for said weighting of said output signal of said system under control is multiplied by said output signal for a specific time duration; and wherein said sequence of said multiplication factors is such that said time duration/bandwidth product of said time duration for halving said frequency bandwidth and said frequency bandwidth of said feedback control loop that is currently set during the adjustment operation is constant during said adjustment operation.

2. The circuit of claim 1, wherein said frequency bandwidth of said feedback control loop is hatved step by step by the sequence of said multiplication factors.

3. The circuit of claim 1, wherein said feedback controlled system is formed by a signal delay circuit.

4. The circuit of claim 1, wherein said weighting circuit is of digital design.

5. The circuit of claim 4, wherein said weighting circuit comprises a signal input for application of an output signal value of said system under control, said signal input being connected to a controllable first shift register; said controllable first shift register shifting said applied output signal value towards the left in a manner dependent on m more significant bits of a control data word.

6. The circuit of claim 5, wherein said weighting circuit comprises a multiplier, which multiplies said signal value that has been shifted towards the left by said controllable first shift register by n less significant bits of said control data word.

7. The circuit of claim 6, wherein said weighting circuit comprises a second shift register, which shifts said product value generated by said multiplier towards the right in accordance with said number n of less significant bits of said control data word.

8. The circuit of claim 7, wherein said weighting circuit comprises a first adder, which adds said signal value that has been shifted towards the left by said first shift register to said product value that has been shifted towards the right by said second shift register and outputs the resulting sum to a signal output of said weighting circuit.

9. The circuit of claim 5, wherein said control data word comprises a first number m of more significant hits and a second number n of less significant bits.

10. The circuit of claim 9, wherein said control data word is buffer-stored in a register.

11. The circuit of claim 10, wherein said weighting circuit comprises a second adder, which adds an offset value to a signal value (S) which is generated by a signal sequence generator.

12. The circuit of claim 11, wherein said signal sequence generator is programmable.

13. The circuit of claim 11, wherein said weighting circuit comprises a memory for buffer-storing said offset value.

14. The circuit of claim 1, wherein said weighting circuit is provided in a loop fitter of said control loop.

15. The circuit of claim 1, wherein a proportional element is connected downstream of said weighting circuit.

16. The circuit of claim 1, wherein an integrator is connected downstream of said weighting circuit.

17. The circuit of claim 1, wherein a differentiator is connected downstream of said weighting circuit.

18. The circuit of claim 1, wherein said weighting circuit is of analogue design.

19. The circuit of claim 1, wherein said subtraction device is a subtractor, a mixer, a resampling filter or a Cordic circuit.

20. A method for adjusting a feedback control loop to an input signal of said feedback control toop, comprising the steps of:
   generating a control difference signal by subtracting a weighted feedback signal from said input signal;
   feeding said control difference signal to a system under control;
   generating an output signal in response to said control difference signal by said system under control;
   generating said weighted feedback signal by multiplying said output signal of said system under control by a sequence of multiplication factors; and
   reducing a frequency bandwidth of said feedback control ioop step by step by said sequence of multiplication factors;
   wherein each of said multiplication factors for said weighting of said output signal of said system under control is multiplied by said output signal for a specific time duration; and
   wherein said sequence of said multiplication factors is such that said time duration/bandwidth product of said time duration for halving said frequency bandwidth and said frequency bandwidth of said feedback control loop that is currently set during the adjustment operation is constant during said adjustment operation.

21. A weighting circuit for adjusting a feedback control loop to an input signal of said feedback control loop;
   said feedback control loop comprising a system under control and a device for generating a control difference signal by subtracting a weighted feedback signal from said input signal; said control difference signal being fed to said system under control;
   said system under control generating an output signal in response to said control difference signal and said output signal of said system under control being multiplied, by means of a weighting circuit by a sequence of multiplication factors for generating said weighted feedback signal; and
   a frequency bandwidth of said feedback control loop being reduced step by step by said sequence of multiplication factors;
   wherein said weighting circuit is of digital design;
   wherein said weighting circuit comprises a signal input for application of an output signal value of said system under control, said signal input being connected to a controllable first shift register; said controllable first shift register shifting said applied output signal value towards the left in a manner dependent on m more significant bits of a control data word;
   wherein said weighting circuit comprises a multiplier; which multiplies said signal value that has been shifted towards the left by said controllable first shift register by n less significant bits of said control data word;
   wherein said weighting circuit comprises a second shift register, which shifts said product value generated by said multiplier towards the right in accordance with said number n of less significant bits of said control data word; and
   wherein said weighting circuit comprises a first adder, which adds said signal value that has been shifted towards the left by said first shift register to said product value that has been shifted towards the right by said second shift register and outputs the resulting sum to a signal output of said weighting circuit.

* * * * *